Figures 1, 2:
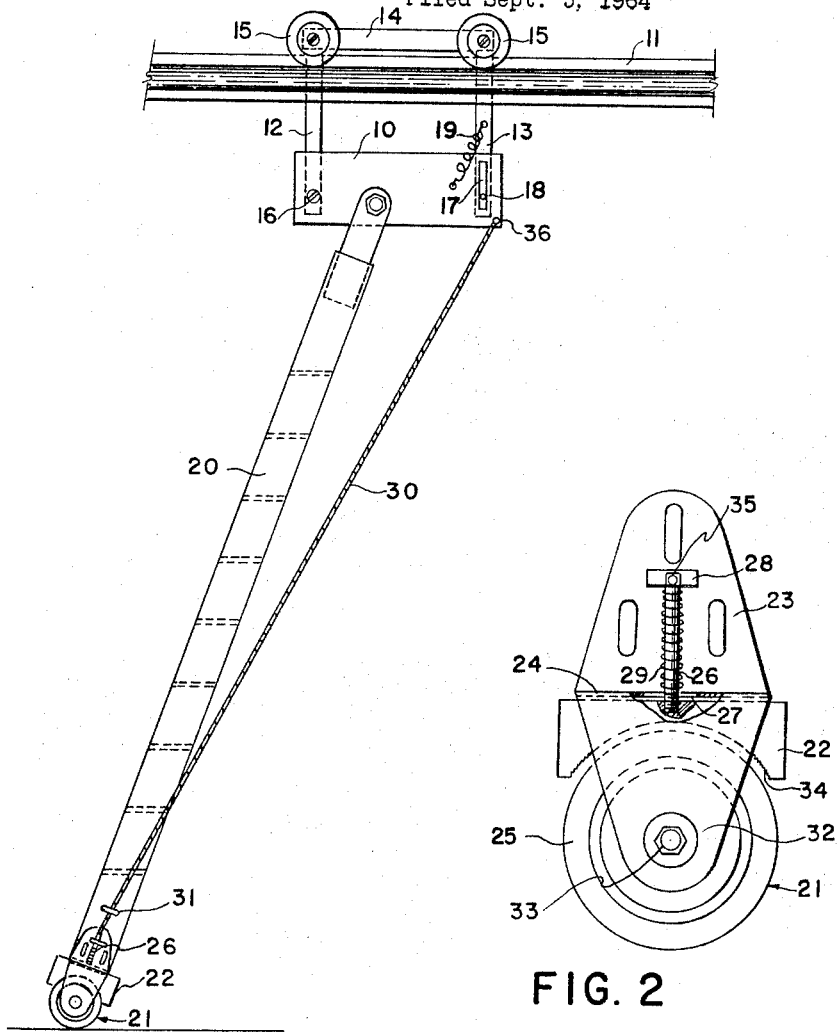

Nov. 8, 1966 A. G. SMITH 3,283,851

WHEEL BRAKE

Filed Sept. 3, 1964

INVENTOR
A. G. SMITH

AGENT

United States Patent Office 3,283,851
Patented Nov. 8, 1966

3,283,851
WHEEL BRAKE
Allan G. Smith, Pointe Claire, Quebec, Canada, assignor to Northern Electric Company Limited, Montreal, Quebec, Canada
Filed Sept. 3, 1964, Ser. No. 394,196
7 Claims. (Cl. 182—15)

This invention relates to wheel brake assemblies for wheeled vehicles and more particularly to wheel brake assemblies for rolling ladders and the like.

The prior art shows a number of brakes for wheeled vehicles using brake shoes and various means for applying pressure to the shoes to brake the wheel. However their braking action is not always positive, resulting in danger to the operator.

More particularly, in connection with rolling ladders, various means have been used in the prior art to hold a ladder in stationary position and also to release the ladder to permit movement of the same to change its location. For example U.S. Patent No. 1,188,991 shows a ladder normally held in stationary service by a spring forcing a shoe against a track which supports the upper part of the ladder. A handle is provided for an operator to release the brake and move the ladder. Here again the braking action depends on the pressure of a spring and could result in danger to the operator if the spring weakens or breaks.

The disadvantages of the prior art are overcome by providing a rolling ladder of the trolley type comprising a wheel supported carriage movably mounted on an overhead track and having a member pivotally attached at one end to the carriage. The other end of the member is attached to the carriage by means of a spring. A ladder is attached to the member intermediate the ends thereof and is supported at the lower end by a wheel assembly. The wheel assembly is provided with a brake arrangement comprising a wedge shaped block which is movable into frictional engagement with the wheel to become wedged between the wheel and a portion of the wheel assembly which supports the wheel upon a slight rotation of the wheel.

Interconnecting means such as a rope is provided between the wedge shaped block and the member for holding the ladder out of engagement with the wheel in the absence of a weight on the ladder, but adapted, when weight is applied to the ladder, to allow the block to drop into engagement with the wheel so that rotation of the wheel draws the block into wedging engagement with the wheel to brake the ladder.

The invention will now be described with reference to the accompanying drawings illustrating an embodiment of the invention in which:

FIG. 1 illustrates a rolling ladder of the trolley-type embodying a wheel brake in accordance with the present invention; and FIG. 2 is an enlarged view of the wheel brake of FIG. 1.

With reference to FIG. 1, a plate member 10 is suspended from a track 11 by means of pendant legs 12 and 13 attached to a carriage 14 having wheels 15 riding on track 11. Member 10 is pivotally connected at one end to leg 12 at point 16. The other end of plate member 10 has a transverse slot 17 slidably receiving a pin 18 in leg 13. A spring 19 urges member 10 to a position such that pin 18 is at or near the bottom of slot 17 as shown in FIGURE 1.

A ladder 20 is attached to plate member 10 at a position intermediate the ends of the member. A wheel assembly 21 is attached to and provides support for the lower end of ladder 20. The wheel assembly is provided with a brake arrangement more clearly illustrated in FIGURE 2.

Referring to FIGURE 2, the wheel brake assembly comprises a frame 23 having two side portions 32 embracing a wheel 25 and through which passes an axle 33 supporting wheel 25. The two side portions 32 are bridged by a web portion 24 overlying and spaced from the periphery of the wheel. A substantially rectangular block (shown in a partily retracted position) having a roughened arcuate surface 34 conforming to the periphery of wheel 25 is disposed between wheel 25 and overlying portion 24. A pin 26 passing through an elongated slot 27 in portion 24 is threaded or otherwise secured to block 22 and slidably guided at its upper end by a bracket 28. Slot 27 is elongated to permit transverse movement of block 22 as it will be clearly understood from the description hereinafter of the operation of the brake. The upper end of pin 26 has an eye 35 for attaching a rope or any other suitable means for lifting the block. A spring 29 held in compression between block 22 and bracket 28 urges the block into frictional engagement with the wheel periphery.

In operation block 22 moves under the action of spring 29 into engagement with the periphery of wheel 25. A slight rotation of the wheel in either direction moves the block in wedging engagement between the periphery of the wheel and the overlying portion 24. The wedging action effectively prevents rotation of the wheel and the braking action is maintained by the tendency of the wheel to rotate further.

As shown in FIGURE 1, a rope 30 (or any other suitable elongated flexible member) is attached at one end to rod 26 and at its other end to the slotted end of plate 10 at point 36. In its normal position, rope 30 is tightened by spring 19 which urges plate 10 to its most upward position and at the same time pulls block 22 out of engagement with wheel 25. When an operator steps on the ladder, spring 19 is tensioned and plate 10 rotates around pivotal point 16. Because rope 30 is connected to plate 10 a further distance from the pivotal point 16 than the ladder 20, the distance between the interconnecting point 36 and block 22 decreases as plate 10 rotates around point 16. Consequently rope 30 slackens and block 22 moves into engagement with wheel 25 thus braking the ladder as explained in detail earlier in this description.

It is understood that the portion of block 22 which comes in contact with wheel 25 does not have to conform exactly with the periphery of the wheel. Block 22 may have any shape, the only restriction being that it must have one portion smaller than the space between the wheel and the overlying portion 24 and two portions of larger dimension than the above space on either side of the smaller portion. It may even take the form of a simple wedge having one portion smaller than the above space and only one portion larger than the above dimension where it is desirable to brake the wheel in one direction only.

It is also understood that spring 29 could also be positioned in other locations to urge block 22 against wheel 25. Spring 29 may even be omitted and gravity alone will be sufficient to move the block in contact with the wheel in the case where block 22 is positioned substantially above the wheel.

What is claimed is:
1. A rolling ladder of the trolley type comprising an overhead track, a wheel supported carriage movably mounted on said track, a member pivotally attached at one end to the carriage, spring means yieldably connecting the other end of the member to the carriage, a ladder attached to the member intermediate the ends thereof, at least one wheel assembly attached to the other end of the ladder, said wheel assembly comprising a wheel, a frame secured to the ladder for rotatably supporting the wheel, the frame having a portion overlying and spaced from a portion of the periphery of the wheel, a block in the form of a wedge having one portion of larger dimension than the space between the wheel and the overlying portion of the frame and having another portion of smaller dimension than said space, said block being normally disposed with said other portion of smaller dimension in said space, means interconnecting the block and the member for holding the block out of engagement with the wheel when the member is in a first position in the absence of a weight on the ladder, said interconnecting means being connected to the member on the opposite side of the ladder from the pivotal attachment of the member with the carriage such that the distance between the connections of said interconnecting means with the member and the block decreases upon movement of the member to a second position under control of the spring means when weight is applied to the ladder whereby said block drops into engagement with the wheel so that rotation of the wheel draws one portion of the block of said greater dimension into said space to wedge the block between said overlying portion of the frame and the wheel to prevent rotation of the wheel.

2. A rolling ladder as defined in claim 1 in which the block has two portions of larger dimension than said space located on either side of said smaller dimension portion whereby the block is wedged between the wheel periphery and the overlying portion of the frame upon rotation of the wheel in either direction.

3. A rolling ladder as defined in claim 1 including a spring acting on the block to urge the latter into engagement with the wheel periphery.

4. A rolling ladder as defined in claim 1 wherein said interconnecting means comprises an elongate flexible member.

5. A rolling ladder as defined in claim 1 wherein said interconnecting means comprises a rope.

6. A rolling ladder as defined in claim 1 including guide means for limiting the movement of said member between said first and second position.

7. A rolling ladder as defined in claim 1 wherein the member defines a slot in said other end thereof, pin means being mounted on the carriage and receivable in said slot to limit the movement of the member.

References Cited by the Examiner

UNITED STATES PATENTS

| | | | |
|---|---|---|---|
| 469,013 | 2/1892 | Des Georges | 188—136 |
| 1,188,991 | 6/1916 | Putnam | 182—15 |
| 2,638,183 | 5/1953 | Prowinsky | 188—29 |

DUANE A. REGER, *Primary Examiner.*